Patented Nov. 15, 1938

2,136,608

UNITED STATES PATENT OFFICE 2,136,608

PROCESS FOR THE RECOVERY OF NAPHTHENIC ACIDS

Arthur L. Blount, Palos Verdes Estates, Calif., assignor to Union Oil Company of California, Los Angeles, Calif., a corporation of California No Drawing. Application October 5, 1936, Serial No. 104,094

13 Claims. (Cl. 260—514)

The present invention relates to the treatment of petroleum distillates and more particularly pertains to the recovery of naphthenic acids from such fractions.

Petroleum oil distillates usually contain a certain amount of organic acidity in the form of naphthenic acids. This organic acidity should be neutralized or removed during the treatment of these distillates. Furthermore, the above mentioned naphthenic acids constitute a valuable by-product so that their recovery from the aforementioned distillates is highly desirable.

The usual procedure of neutralizing the organic acidity caused by the presence of naphthenic acids in the petroleum oil distillates, consists in treating the distillates with an alkali solution, as for example, a 4% or similar solution of sodium hydroxide. This washing causes a chemical reaction between the sodium hydroxide and the naphthenic acid with the resultant formation of the soaps of said naphthenic acids. The treated distillates are then allowed to stand to cause phase separation, the lower phase comprising an aqueous solution of naphthenate soaps being then removed and treated to recover and purify the naphthenic acids contained therein.

The above mentioned treatment of the petroleum distillates with an alkali solution, however, is often attended by serious emulsion troubles which cause the entrainment of the alkali or of the naphthenate soaps in the distillate being treated. This, of course is highly undesirable in that it requires further refining to break the emulsions thus formed. In fact, the emulsification in some instances is such that it is substantially impossible or at least highly impractical to proceed with the treatment of the breaking up of the emulsions and the recovery of the distillates free from the alkali and/or naphthenate soaps.

In order to avoid this difficulty it has been previously the general practice to conduct the washing of the distillates with the above mentioned alkali solution at comparatively elevated temperatures of the order of 160° F. to 200° F. and even higher. However, the use of such elevated temperatures has been found to be undesirable. Thus, the distillate stream becomes saturated with water at the temperature of operation and, upon subsequent cooling the water precipitates out in the form of mist or of a very fine suspension, requiring considerable time for coalescence and settlement. Also, the use of elevated temperatures during the alkali treatment increases the solubility of the alkali soaps in the distillates being treated. Upon cooling the dissolved soaps precipitate out to give a cloudy appearance to the treated distillate. Furthermore, the use of elevated temperatures during the washing with alkali solutions results in the setting up or formation of convection currents which interfere with the settling of the alkali and/or naphthenic soap solutions from the treated distillate.

It is therefore the main object of the present invention to provide a method of neutralizing the organic acidity of the petroleum distillates or oils, and of recovering the naphthenic acids contained therein, whereby all of the above mentioned difficulties are avoided.

It is a further object of the invention to provide a method of recovering the afore-mentioned naphthenic acids while preventing the emulsification.

It is a still further object of the invention to eliminate the necessity of employing excessively high temperatures during the neutralization of the petroleum oils or their distillates and during the recovery of naphthenic acids therefrom.

It is another object of the present invention to provide a method of neutralizing petroleum oils, their distillates or fractions, wherein the undesirable saturation of the distillates with water and soaps, and the detrimental convection currents in the settling or the like tanks, are avoided or at least reduced to a minimum.

I have now discovered that the above and other objects may be realized by treating or neutralizing the organic acidity contained in petroleum oils, their distillates or fractions, with an alkali (or caustic) solution containing soaps of acids of the type of naphthenic acids obtained or derived from oils, etc., of a lower specific gravity than those being treated. The afore-mentioned naphthenate soaps having a relatively lower average molecular weight than the naphthenate soaps produced by the alkali washing of a given petroleum oil, distillate or fraction, may be added to the alkali solution in any known manner. Thus, the alkali solution (consisting for example, of an aqueous solution of sodium hydroxide) may be commingled with the alkali wastes arising from a previous treatment or neutralization of a petroleum fraction, etc., having a lower specific gravity than that which is to be treated by said mixture of alkali solution and alkali wastes. In the alternative, an alkali solution, as described above, may be first employed to wash a fraction or distillate of a relatively lower specific gravity, and then used to neutralize a comparatively heavier fraction, the first washing being such that only a portion of the alkali is converted into the naphthenic acid soap. Again, naphthenic acids of a type having a lower average molecular weight than that of the acids found in the oil to be treated, may be added to the alkali solution in such quantities and under such conditions that only a portion of said alkali is used up, thus producing an aqueous mixture containing alkali and soaps of these relatively low molecular weight naphthenic acids.

The presence of the soaps of relatively low molecular weight organic acids in the aqueous alkali solution (such as an aqueous solution of sodium hydroxide) appears to be highly desirable since it permits the contacting or neutralizing of the oil with said alkali solution at relatively low temperatures without emulsification difficulty, thus avoiding any excessive convection currents in the settling tank. The presence of the aforementioned soaps of organic acids, furthermore, permits the use of lower temperatures at which only negligible quantities of water and soap are dissolved in the oils being treated.

Although I do not desire to be limited by any theory of operation it is believed that the presence in the alkali solution of the above described alkali soaps of naphthenic or similar organic acids (of an average molecular weight lower than that of the acids in the oils to be treated) permits a satisfactory separation of the wash liquor, i. e. of the spent alkali, from the oil or distillate treated, by acting as an agent which aids in dissolving the soaps produced during the washing or neutralizing step. Thus, for example, the low molecular weight organic acid soaps recovered from kerosene or similar light distillates are soluble to a relatively large extent in the alkali used in a neutralizing operation. On the other hand, the organic soaps formed during the neutralization of a gas-oil or similar heavier distillate are less soluble in the alkali solution, and, therefore, tend to precipitate out and/or to form colloidal suspensions in the oil. These suspensions promote emulsions which are sometimes rather persistent and difficult to break. Now, the presence in the alkali solution of soaps which have been formed during the neutralization of an oil or distillate containing organic acids which form caustic-soluble (i. e. alkali-soluble) soaps, aids the solution of the high molecular weight or less soluble soaps in the washing liquor, thus reducing and even substantially eliminating the colloidality and emulsifying properties of the high molecular weight soaps.

The invention may therefore be stated to reside broadly in a process of treating petroleum and like oils, their distillates or fractions, for the purpose of neutralizing organic acidity and/or recovering the organic acids contained therein, said process comprising the step of contacting said oils with an alkali or caustic solution containing soaps of organic acids of a lower average molecular weight than that of the acids present in the oils being treated.

The invention further resides in the treatment of the above described oils with a mixture comprising a caustic or alkali solution and an organic soap derived from the neutralization of an oil of a lower specific gravity than that of the one to be treated.

The invention still further resides in incorporating into a caustic solution of a quantity of soaps of naphthenic acids having a relatively low average molecular weight, and then neutralizing with said mixture an oil, its distillate or fraction, containing organic acids of the type or naphthenic acids of an average molecular weight greater than that of the naphthenic acids, the naphthenate soaps of which have been added to the aforementioned alkali solution.

Specifically stated, the invention resides in producing an aqueous mixture containing an alkali (such as sodium hydroxide) and soaps of naphthenic or like acids of a given average molecular weight, treating an oil containing naphthenic acids of an average molecular weight greater than that used in the preparation of the aforementioned mixture with said mixture to neutralize said acids and convert them into soaps, causing the said naphthenate soap-containing liquor thus formed to separate completely out of the treated oil together with the aqueous solution of the partially or substantially spent alkali, and separating the aqueous phase thus produced from the neutralized oil.

The incorporation of the above described naphthenate soaps into the aqueous solution of caustic alkali permits the neutralization of the organic acidity of oils at temperatures which are sufficiently low to reduce to a minimum convection currents in the settling tanks and the solubility of water and soaps in the oil being treated, and at the same time prevents the formation of any persistent emulsions which would have formed if the naphthenate or similar soaps had not been added to the alkali solution.

The quantity of organic soaps incorporated into the aqueous alkali solution will vary within a rather wide range depending on a number of conditions, such as the type and concentration of the soaps employed, the acidity and character of the oil being treated, the temperature at which the washing is to be performed, as well as a number of other conditions which must all be considered to determine the optimum ratio of alkali to soaps in the treating and neutralizing agent. It has been found, however, that an aqueous mixture containing 95% to 60% of unused alkali solution and from 5% to 40% of alkali wastes obtained during the neutralization of a lower boiling distillate (as compared to the one to be treated) will usually produce satisfactory results.

As a practical example of the realization of the process a Diesel fuel distillate having a specific gravity of 0.865 and having an acid number of 0.5 mg. KOH per gram was treated at a temperature of 120° F. with an aqueous alkaline mixture consisting of 80% (by volume) of a 4% (by weight) sodium hydroxide solution and 20% of substantially spent alkali used in the neutralization of a kerosene distillate which had a specific gravity of 0.810 and an original acid number of 0.3 mg. KOH per gram. After a thorough commingling the mixture was allowed to stand and a highly satisfactory separation of the aqueous phase from the neutralized Diesel engine distillate was obtained at the end of ten minutes. After separation of the phases the distillate was found to be substantially neutral, all of the naphthenic and similar acids being found in the form of soaps in the aqueous phase. On the other hand no satisfactory separation of phases was obtainable even at 160° F. when the same Diesel engine distillate was neutralized with a straight 4% aqueous solution of sodium hydroxide in a period of 90 minutes. During the above experiments it was also found that the convection currents created during treatment at 160° F. were substantially decreased when the treatment was carried out at 120° F. and that the solubility of water and soaps in the distillate being treated was greatly decreased so that upon cooling the distillate did not have a cloudy appearance.

Experiments have further disclosed that the presence of organic soaps such as those contained in alkali solutions used for a neutralization of an oil of a lower specific gravity, in the treating agent permit the neutralization of oils or their distillates having a relatively higher specific gravity at temperatures as low as 100° F. without the formation of the aforementioned persistent emulsions.

The naphthenic acids may be recovered from the alkali solutions obtained after the above described neutralization step by any of the well known processes. Thus, the waste alkali liquor comprising the aqueous phase from the above neutralization operation may be treated with mineral acids such as sulfuric acid to acidify the soaps and convert them into naphthenic acids which latter are then separated as the oily phase. As an alternative the aqueous phase may first be deoiled and distilled to remove the water, after which the soaps are converted into naphthenic acids by acidification with a mineral acid, the acids being then separated from the aqueous layer. The crude naphthenic acids thus formed may then be acid or clay treated in the presence or absence of diluents to purify said acids and to produce naphthenic acids having a light and stable color and a bland odor.

This invention is not limited by any theory of its mechanism nor by any details which have been given merely for purpose of illustration, but is limited only in and by the following claims in which I wish to claim all novelty inherent in the invention.

I claim:

1. In a process for recovering the organic acids contained in petroleum oils and its fractions, the step of contacting said oils with an aqueous alkali solution containing soaps of organic acids of a lower average molecular weight than that of the acids present in the oils being treated.

2. In a process for recovering the naphthenic acids contained in a petroleum oil and its fractions, the step of contacting said oil with an aqueous alkali solution containing soaps of naphthenic acids of a lower average molecular weight than that of the naphthenic acids present in the oil being treated.

3. In a process for recovering the naphthenic acids contained in a petroleum oil and its fractions, the step of contacting said oil with an aqueous alkali solution containing soaps of naphthenic acids of a sufficiently lower average molecular weight than that of the naphthenic acids present in the oil to be treated so that any substantial emulsification is prevented.

4. In a process for neutralizing the organic acidity of a petroleum oil and of its fractions and distillates and for recovering the organic acids contained therein, the step of contacting said oil with a mixture comprising an aqueous alkali solution and an organic acid soap derived from the neutralization of an oil of a lower specific gravity than that of the oil to be treated.

5. In a process according to claim 4, wherein the organic acid soap in the reagent mixture comprises a naphthenate soap derived from a previous neutralization of an oil of a lower specific gravity than that of the oil to be treated with said reagent mixture.

6. A process for recovering naphthenic acids from petroleum oils and its fractions, which comprises producing a mixture of an aqueous caustic solution with soaps of naphthenic acids having a relatively low average molecular weight, and employing said mixture to neutralize the petroleum oil to recover therefrom the naphthenic acids of an average molecular weight substantially greater than that of the naphthenic acids, the soaps of which have been commingled with the aqueous caustic solution.

7. A process for neutralizing the organic acidity of a petroleum oil and of its fractions and for recovering the naphthenic and like acids contained therein, which comprises commingling an unused aqueous alkali solution with alkali wastes derived from the neutralization of an oil of a lower specific gravity than that of the oil to be treated, treating said acidity-containing oil with said reagent mixture, and separating the neutralized acid-free oil from the aqueous phase containing the spent alkali and the soaps of the acids recovered from the oil thus treated, said lower specific gravity alkali waste acting as an agent to aid the dissolving of the last mentioned soaps in the aqueous phase.

8. In a process according to claim 7, wherein the aqueous reagent mixture contains approximately 95 to 60% by volume of unused alkali solution and from 5 to 40% by volume of the aforementioned alkali wastes.

9. In a process according to claim 7, wherein the neutralizing step is realized at a temperature below 160° F. and preferably between 100° F. and 120° F.

10. In a process according to claim 7, wherein the neutralizing step is realized at a temperature below 160° F. and preferably between 100° F. and 120° F., and wherein the alkali wastes added to the aqueous alkali solution prior to the treatment of the acidity-containing oil are of a specific gravity sufficiently lower than that of the oil to be treated so as to prevent any substantial emulsification at the operating temperature, and to aid the dissolving in the aqueous phase of the soaps of the acids recovered from the oil thus treated.

11. A process for neutralizing a petroleum oil and its fractions and for recovering the naphthenic acids contained therein, which comprises mixing an aqueous sodium hydroxide solution with an aqueous solution of soaps of naphthenic and like acids of a given average molecular weight, commingling said mixture with an oil containing naphthenic and like acids of an average molecular weight greater than that used in the preparation of the reagent mixture to convert said higher molecular weight naphthenic acids into their soaps, causing said soap containing aqueous solution to separate out of the treated oil, and removing the aqueous phase thus produced from the neutralized oil.

12. In a process according to claim 11, wherein the treating step is realized at a temperature ranging between about 100° F. and 120° F.

13. In a process according to claim 11, wherein the aqueous reagent mixture comprises an aqueous solution of sodium hydroxide and spent alkali derived from the neuralization of an oil of a lower specific gravity than that of the oil treated, and wherein said spent alkali acts as an agent to aid the dissolving of the soap in the aqueous phase and to prevent any substantial emulsification.

ARTHUR L. BLOUNT.